United States Patent
Kadkly

(10) Patent No.: US 8,223,443 B2
(45) Date of Patent: Jul. 17, 2012

(54) COLLECTION OPTICS

(75) Inventor: Azmi Kadkly, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 90 days.

(21) Appl. No.: 12/873,387

(22) Filed: Sep. 1, 2010

(65) Prior Publication Data

US 2012/0050890 A1 Mar. 1, 2012

(51) Int. Cl.
*G02B 17/00* (2006.01)
*G02B 5/10* (2006.01)

(52) U.S. Cl. ........ 359/731; 359/859

(58) Field of Classification Search .......... 359/729, 359/731, 859, 861
See application file for complete search history.

(56) References Cited

U.S. PATENT DOCUMENTS

| | | | |
|---|---|---|---|
| 2,327,947 A * | 8/1943 | Warmisham | 359/729 |
| 4,523,816 A | 6/1985 | Kreitzer | |
| 5,089,910 A | 2/1992 | Sigler | |
| 7,158,215 B2 | 1/2007 | Harned et al. | |
| 7,405,802 B2 | 7/2008 | Harned et al. | |
| 7,408,703 B2 | 8/2008 | Matsuki et al. | |
| 7,643,128 B2 | 1/2010 | Harned et al. | |
| 2007/0153368 A1 | 7/2007 | Vucinic et al. | |

FOREIGN PATENT DOCUMENTS

JP 1992-348254 A 12/1992
JP 2003-307680 A 10/2003

* cited by examiner

*Primary Examiner* — William Choi
(74) *Attorney, Agent, or Firm* — Luedeka Neely Group, P.C.

(57) ABSTRACT

An imaging system including a back-plane reflector having a concave aspherical reflecting surface and an outer diameter that is no greater than a first distance, with an aperture formed in the back-plane reflector, the aperture for admitting light from a field of view to the imaging system, a fore-plane reflector having a concave aspherical reflecting surface and an outer diameter that is no greater than the first distance, with an aperture formed in the fore-plane reflector, the aperture for discharging the light from the imaging system to an image plane, and a central reflector having a convex aspherical reflecting surface for receiving light from the fore-plane reflector and discharging the light from the imaging system through the aperture in the fore-plane reflector.

19 Claims, 1 Drawing Sheet

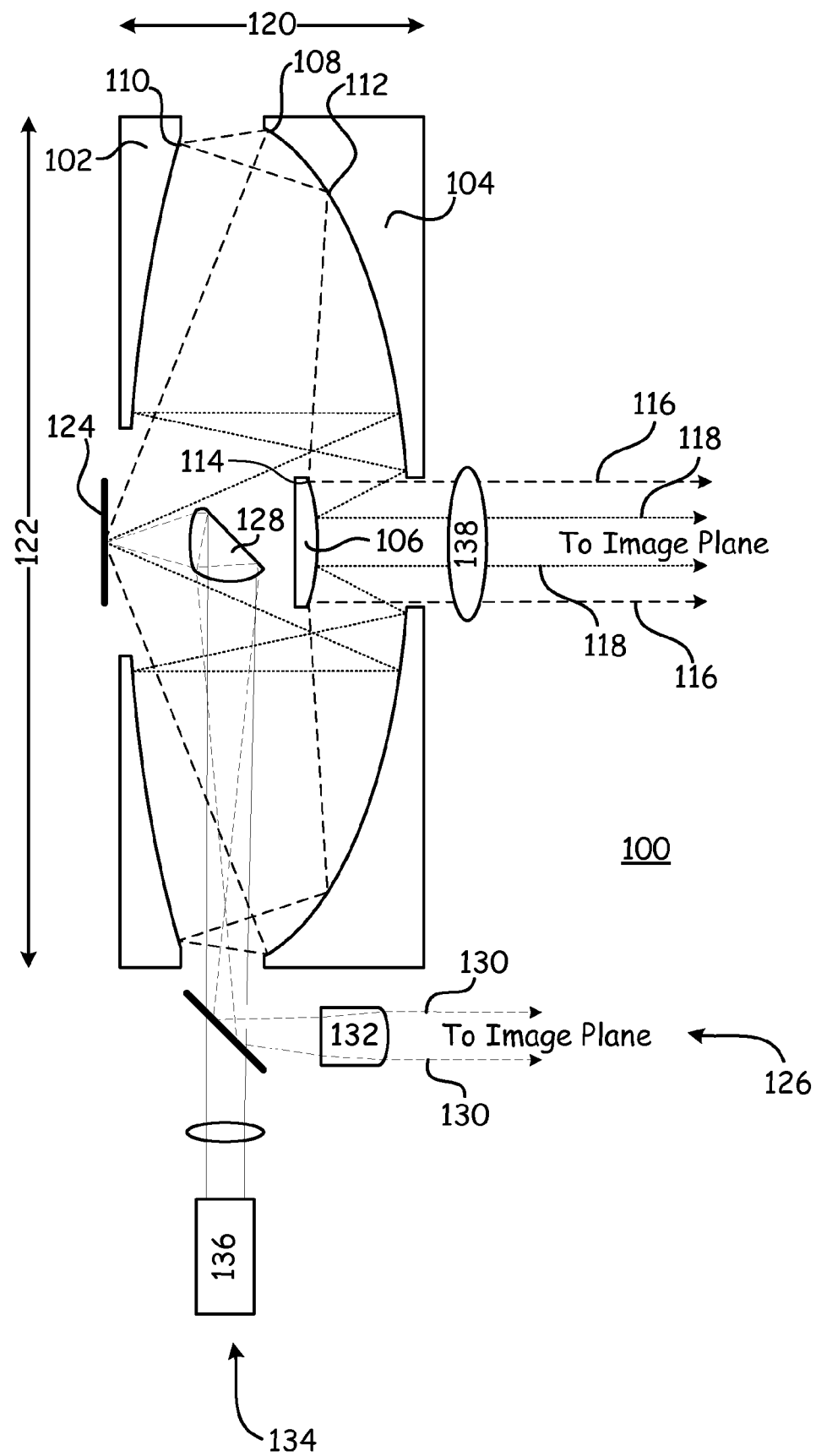

COLLECTION OPTICS

FIELD

This invention relates to the field of integrated circuit fabrication. More particularly, this invention relates to ultraviolet optical inspection of integrated circuits.

INTRODUCTION

Optical inspection systems are used to detect very small defects in the substrates and structures of which integrated circuits are formed. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

There is a continual need to increase both the throughput and the sensitivity of such inspection systems. In optics-based inspection tools, the use of very high numerical aperture (NA) optics, and high-power, short-wavelength ($\lambda$) radiation (typically within the deep ultraviolet range) provided by emission-pulsed lasers are ways to achieve these goals. The optical resolution (R) of such a system is defined by the Rayleigh criterion, where $R=(0.61)\lambda/NA$. The smaller the value of the optical resolution (R), the higher the resolution of the optical system.

Pulsed ultraviolet lasers are currently the only source for generating powers that are high enough to enable the inspection tool to achieve the required throughput and sensitivity. These laser sources tend to have a fairly wide wavelength emission bandwidth in comparison to low-power continuous-wave laser sources, which tend to be pure single-wavelength emission sources.

Optical systems based solely on refractive (glass) elements suffer from a lack of color correction and chromatic aberrations in the ultraviolet range, due to the limited selection of glass materials with good ultraviolet transmission characteristics. Thus, refractive optics tend to produce poor image qualities at higher numerical apertures. One solution to that problem is the use of catadioptric systems, which are combinations of reflective elements and refractive elements. These systems provide a limited correction of the chromatic aberrations within a small bandwidth of the source light.

What is needed, therefore, is a system that reduces problems such as those described above, at least in part.

SUMMARY OF THE CLAIMS

The above and other needs are met by an imaging system including a back-plane reflector having a concave aspherical reflecting surface and an outer diameter that is no greater than a first distance, with an aperture formed in the back-plane reflector, the aperture for admitting light from a field of view to the imaging system, a fore-plane reflector having a concave aspherical reflecting surface and an outer diameter that is no greater than the first distance, with an aperture formed in the fore-plane reflector, the aperture for discharging the light from the imaging system to an image plane, and a central reflector having a convex aspherical reflecting surface for receiving light from the fore-plane reflector and discharging the light from the imaging system through the aperture in the fore-plane reflector.

By forming a main imaging channel using only the catoptric elements described, the system exhibits a broad numerical aperture, is wavelength insensitive, has extremely high resolution, and is very compact.

In various embodiments according to this aspect of the invention, the imaging system is a pure catoptric system. In some embodiments the first distance is no more than about 172 millimeters. In some embodiments the central reflector is disposed between the back-plane reflector and the fore-plane reflector. In some embodiments the reflecting surface of the back-plane reflector faces the reflecting surface of the fore-plane reflector. In some embodiments the light admitted to the image system from the field of view reflects twice off the fore-plane reflector, and once each off of both the back-plane reflector and the central reflector. In some embodiments the system admits from the field of view and discharges to the image plane a fan of light having a numerical aperture of from about 0.375 to about 0.93. In some embodiments a dioptric element is disposed so as to receive the light discharged from the central reflector through the aperture in the back-plane reflector.

In some embodiments a right angle fold prism is disposed between the back-plane reflector and the central reflector for capturing a portion of the light from the field of view and discharging the portion of light from the system between the fore-plane reflector and the back-plane reflector. In some embodiments the right angle fold prism has curved input and output faces. In some embodiments the right angle fold prism admits from the field of view and discharges from the system a fan of light having a numerical aperture of about 0.3. Some embodiments include an illumination source for directing illumination into the system between the back-plane reflector and the fore-plane reflector, into the right angle fold prism and onto the field of view.

BRIEF DESCRIPTION OF THE DRAWING

Further advantages of the invention are apparent by reference to the detailed description when considered in conjunction with the FIGURE, which is not to scale so as to more clearly show the details, wherein like reference numbers indicate like elements throughout, and which depicts an imaging system according to an embodiment of the present invention.

DETAILED DESCRIPTION

The various embodiments of the present invention are directed toward a three-reflector, all reflective, catoptric imaging system having no refractive elements, and thus are free of all forms of chromatic aberrations and, in principle, will operate within any bandwidth and all wavelengths of the laser source.

Various embodiments include a finite-conjugate system with a single magnification stage. One of the reflector surfaces is used two times, and thus all of the optical rays emanating from the source are reflected twice by this reflector, resulting in a four-reflection system that meets the performance requirements of a diffraction-limited lens.

With reference now to the FIGURE, there is depicted an embodiment 100 of the present invention. The system 100 uses three reflecting surfaces, including a fore-plane reflector 102, a back-plane reflector 104, and a central reflector 106, one surface 104 of which is used two times. Because of this, an optical ray 118 emanating from the object plane 124 undergoes four reflections 108, 110, 112, and 114 before focusing into an image plane (not depicted). One reason for using four reflections 108, 110, 112, and 114 (instead of a lesser number of reflections) is that these four reflections allow a higher numerical aperture beam to exit the confinements of the folding reflectors and form an image.

The radii of curvature and reflector separations of all of the reflecting surfaces are chosen to achieve specific design requirements. The radius of curvature of the reflector 104 is chosen to reduce the height (convergence) of the marginal ray 116 emanating from the object plane 124 as it hits reflector 102 after its first reflection from reflector 104. The radius of curvature of reflector 102 is chosen to reduce the convergence of the marginal ray 116 as it hits reflector 106 after its second reflection from reflector 104, thereby reducing the obscuration ratio. Finally, the radius of curvature of reflector 106 is chosen to reduce the size of the hole in reflector 104 that is required for the marginal ray 116 to exit the system 100, which also reduces the obscuration ratio.

Due to this convergence of the marginal rays, a very compact system can be realized with a reduced obscuration ratio. In other reflecting systems, the primary and secondary mirrors are spaced farther apart to achieve the desired beam convergence. The base curvature of the reflectors 102, 104, and 106 are chosen to achieve this rapid convergence and then the aspheric coefficients are added to correct the primary and higher order aberrations of the optical system 100. The sag of a surface with aspheric coefficients is defined by the following polynomial:

$$s = \frac{ch^2}{1+\sqrt{1-(1+k)c^2h^2}} + \sum_{i}^{N} A_i h^{2i}$$

$$i =, 2, 3, \ldots$$

Where: s is the sag of the surface,
c is the base radius of curvature,
h is the height from the axis,
k is the conic constant, and
the A's are the aspheric coefficients.

The A's are added during the optimization procedure in a systematic manner to reduce the aberrations of the rays emanating from the object plane 124 until the desired degree of correction is achieved, while maintaining the first principle of the design, which is the rapid convergence of the marginal rays.

In-line reflective optical systems have a central obscuration that prevents collection of a portion of the numerical aperture, thereby reducing its sensitivity. In the system 100, the location and size of the reflector 106 is selected so as to reduce the central obscuration. As the reflector 106 is brought closer to the reflector 104, the central obscuration is reduced. However, care must be taken that the marginal rays 116 do not miss the reflector 106 as they exit the system 100, which would reduce the numerical aperture of the system 100.

This balance is achieved in the present system 100 by forming the reflector 106 with a non-spherical surface profile, in this embodiment, an aspheric profile with higher polynomial coefficients. In the system 100, the location and size of the reflector 106 reduces the obscuration to no more than about sixteen percent, whereas a typical Schwarzschild objective has an obscuration of about twenty percent.

The overall length 120 of the system 100 and the inter-reflector separation are also adjusted to achieve the results described above, and to reduce the size of the system 100. As a result, the admitted range of numerical apertures is from about 0.375 (beam boundaries 118) to about 0.93 (beam boundaries 116), as depicted. This design produces a compact system 100 that in one embodiment is enclosed within a cylindrical housing measuring only about 172 millimeters in diameter 122, with a length 120 of about 65 millimeters.

The three reflecting surfaces 102, 104, and 106 in this embodiment are used to generate a diffraction-limited spot within the field of view 124, which is from about one hundred and fifty microns in diameter to about three hundred microns in diameter. This focused spot is magnified by the system 100 by a factor of about 52.8× at the image plane (not depicted). The compactness of this system 100 prevents the formation of intermediate images, which commonly occurs in catoptric systems. The compactness of the system 100 also reduces the needed diameter of the reflectors 102 and 104. The diameter of reflector 104 is determined by its physical distance from the object plane 124, and the diameter of reflector 102 is determined by the path of the marginal rays 116.

The surface profile of the reflector 104 dictates the path and direction of the marginal rays 116. If the rays 116 diverge after reflection 108 from reflector 104, they will hit the reflector 102 at a position 110 that is radially greater than position 108, and thus the diameter of reflector 102 would need to be larger than it is in the depicted embodiment.

In some embodiments, aberrations in the system 100 are reduced by forming some or all of the reflectors 102, 104, and 106 with aspherical surface profiles. A surface with a spherical profile has only a limited capability to correct aberrations of a high numerical aperture optical system. Surfaces with aspherical profiles, on the other hand, can provide greater design freedom, which can be used to reduce the aberrations of the lens that are associated with higher numerical aperture inputs. In the current embodiment 100, the reflectors 102, 104, and 106 have profiles that are aspherical, which reduces the size of the system 100, and improves the collection efficiency.

In order to collect the lower numerical aperture scattering from the substrate plane 124 (low numerical aperture dark field), a second optical channel 126 is added in one embodiment to the system 100, which makes use of a curved right angle fold prism 128, with an effective focal length of about 19.28 millimeters. The fold prism 128, with curved input and output faces, enables the second channel 126 to be very compact so that it fits in the dead space of the large numerical aperture collection optics without blocking any of the useable areas of the reflector system 100. The curvatures of the prism 128 input and output surfaces are configured to capture a 0.3 numerical aperture fan of rays 130 and contain it within the free space available between the reflectors 102 and 104 before exiting between them.

All of the elements 132 of the second channel 126 are refractive, and thus the second channel 126 exhibits relatively higher dispersion. Therefore, this second channel 126 is corrected for a design wavelength of 266 nanometers+150 picometers Full Width Half Maximum (266 nm+150 pm FWHM). The dispersion of this channel 126 is tolerable because its numerical aperture coverage is much lower than the main channel.

Because the second channel 126 collects a numerical aperture up to about 0.3, and the main optical channel collects a numerical aperture of from about 0.375 to about 0.93, only numerical apertures within a range of from about 0.30 to about 0.375 are not collected by the system 100.

The fold prism 128 in the second channel 126 can also be used as part of the illumination channel 134, using a light source 136. The embodiment depicted generates focused spots of about 1.5 microns in diameter on the focal plane 124, extending to a field diameter of about 150 microns.

As described above, the aspherical components of the surfaces 102, 104, and 106 play an important role in achieving a high degree of correction and resolution. The base spherical curves are set so as to form a rapid convergence of the bundle of rays from the object plane 124. This limits their capability to correct the system aberrations, and thus the need for the higher order polynomial coefficients.

Another characteristic of this design is the use of two reflections off of the reflector 104. This has the advantage of reducing cost, but imposes limitations on the degree of correction that can be achieved by this surface. Initially, the marginal rays 116 are diverging as they hit the surface 104 at 108, and converge after the second reflection off surface 102. The direction cosine of the rays changes sign in the process, yielding the aberrational characteristics of the rays. This imposes additional constraints on the design, making it virtually impossible to correct without the aid of the aspheric coefficients.

In other reflective designs, each reflector is used only once, and thus can have purely spherical forms. However, such systems will also be larger than the present system 100.

These two characteristics of the system 100—base curves that impart a rapid convergence of the marginal rays and the systematic addition of the aspheric coefficients to correct the system aberrations—make the system 100 unique in the art of optical design.

In another embodiment a thin refractive element 138 is added after the reflector 106, just outside the mirror box of the system 100, to provide additional correction for off-axis fields. This element 138 is thin enough so as to not have any impact on the chromatic correction of the system 100, but doubles the field size 124.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An imaging system comprising:
    a back-plane reflector having a concave aspherical reflecting surface and an outer diameter that is no greater than a first distance, with an aperture formed in the back-plane reflector, the aperture for admitting light from a field of view to the imaging system,
    a fore-plane reflector having a concave aspherical reflecting surface and an outer diameter that is no greater than the first distance, with an aperture formed in the fore-plane reflector, the aperture for discharging the light from the imaging system to an image plane, and
    a central reflector having a convex aspherical reflecting surface for receiving light from the fore-plane reflector and discharging the light from the imaging system through the aperture in the fore-plane reflector,
    wherein the light admitted to the image system from the field of view reflects twice off the fore-plane reflector, and once each off of both the back-plane reflector and the central reflector.

2. The imaging system of claim 1, wherein the imaging system is a pure catoptric system.

3. The imaging system of claim 1, wherein the first distance is no more than about 172 millimeters.

4. The imaging system of claim 1, wherein the central reflector is disposed between the back-plane reflector and the fore-plane reflector.

5. The imaging system of claim 1, wherein the reflecting surface of the back-plane reflector faces the reflecting surface of the fore-plane reflector.

6. The imaging system of claim 1, wherein the system admits from the field of view and discharges to the image plane a fan of light having a numerical aperture of from about 0.375 to about 0.93.

7. The imaging system of claim 1, further comprising a dioptric element disposed so as to receive the light discharged from the central reflector through the aperture in the back-plane reflector.

8. The imaging system of claim 1, further comprising a right angle fold prism disposed between the back-plane reflector and the central reflector for capturing a portion of the light from the field of view and discharging the portion of light from the system between the fore-plane reflector and the back-plane reflector.

9. The imaging system of claim 8, wherein the right angle fold prism has curved input and output faces.

10. The imaging system of claim 8, wherein the right angle fold prism admits from the field of view and discharges from the system a fan of light having a numerical aperture of about 0.3.

11. The imaging system of claim 8, further comprising an illumination source for directing illumination into the system between the back-plane reflector and the fore-plane reflector, into the right angle fold prism and onto the field of view.

12. An imaging system comprising:
    a back-plane reflector having a concave aspherical reflecting surface and an outer diameter that is no greater than a first distance, with an aperture formed in the back-plane reflector, the aperture for admitting light from a field of view to the imaging system,
    a fore-plane reflector having a concave aspherical reflecting surface and an outer diameter that is no greater than the first distance, with an aperture formed in the fore-plane reflector, the aperture for discharging the light from the imaging system to an image plane, wherein the reflecting surface of the back-plane reflector faces the reflecting surface of the fore-plane reflector, and
    a central reflector disposed between the back-plane reflector and the fore-plane reflector and having a convex aspherical reflecting surface for receiving light from the fore-plane reflector and discharging the light from the imaging system through the aperture in the fore-plane reflector,
    wherein the light admitted to the imaging system from the field of view reflects twice off the fore-plane reflector, and once each off of both the back-plane reflector and the central reflector.

13. The imaging system of claim 12, wherein the system admits from the field of view and discharges to the image plane a fan of light having a numerical aperture of from about 0.375 to about 0.93.

14. The imaging system of claim 12, further comprising a dioptric element disposed so as to receive the light discharged from the central reflector through the aperture in the back-plane reflector.

15. The imaging system of claim 12, further comprising a right angle fold prism disposed between the back-plane reflector and the central reflector for capturing a portion of the light from the field of view and discharging the portion of light from the system between the fore-plane reflector and the back-plane reflector.

16. The imaging system of claim 15, wherein the right angle fold prism has curved input and output faces.

17. The imaging system of claim 15, wherein the right angle fold prism admits from the field of view and discharges from the system a fan of light having a numerical aperture of up to about 0.3.

18. The imaging system of claim 15, further comprising an illumination source for directing illumination into the system between the back-plane reflector and the fore-plane reflector, into the right angle fold prism and onto the field of view.

19. An imaging system comprising:
   a back-plane reflector having a concave aspherical reflecting surface and an outer diameter that is no greater than a first distance, with an aperture formed in the back-plane reflector, the aperture for admitting light from a field of view to the imaging system,
   a fore-plane reflector having a concave aspherical reflecting surface and an outer diameter that is no greater than the first distance, with an aperture formed in the fore-plane reflector, the aperture for discharging the light from the imaging system to an image plane, wherein the reflecting surface of the back-plane reflector faces the reflecting surface of the fore-plane reflector,
   a central reflector disposed between the back-plane reflector and the fore-plane reflector and having a convex aspherical reflecting surface for receiving light from the fore-plane reflector and discharging the light from the imaging system through the aperture in the fore-plane reflector, and
   a right angle fold prism having curved input and output faces and disposed between the back-plane reflector and the central reflector for capturing a portion of the light from the field of view having a numerical aperture of up to about 0.3 and discharging the portion of light from the system between the fore-plane reflector and the back-plane reflector,
   wherein the light admitted to the imaging system from the field of view reflects twice off the fore-plane reflector, and once each off of both the back-plane reflector and the central reflector, and as discharged from the system off the central reflector has a numerical aperture of from about 0.375 to about 0.93.

\* \* \* \* \*